United States Patent
Malhotra et al.

(10) Patent No.: US 12,382,415 B1
(45) Date of Patent: Aug. 5, 2025

(54) NETWORK FUNCTION REGISTRATION WITH NETWORK REPOSITORY FUNCTIONS

(71) Applicant: T-Mobile Innovations LLC, Overland Park, KS (US)

(72) Inventors: Rajil Malhotra, Olathe, KS (US); Chidambaram Pavanasam, Overland Park, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 1113 days.

(21) Appl. No.: 17/325,916

(22) Filed: May 20, 2021

(51) Int. Cl.
*H04W 60/00* (2009.01)

(52) U.S. Cl.
CPC ................. *H04W 60/00* (2013.01)

(58) Field of Classification Search
CPC ....................................................... H04W 60/00
See application file for complete search history.

(56) References Cited

U.S. PATENT DOCUMENTS

| | | | |
|---|---|---|---|
| 10,142,994 | B2 | 11/2018 | Lee et al. |
| 10,638,415 | B2 | 4/2020 | Baek et al. |
| 2018/0192471 | A1 | 7/2018 | Li et al. |
| 2019/0239150 | A1* | 8/2019 | Ma .................... H04W 48/17 |
| 2019/0342851 | A1 | 11/2019 | Shan et al. |
| 2020/0092758 | A1 | 3/2020 | Youn et al. |
| 2022/0124162 | A1* | 4/2022 | Zhang .................... H04W 24/02 |
| 2022/0159433 | A1* | 5/2022 | Flinck .................... H04W 12/06 |
| 2022/0247779 | A1* | 8/2022 | Rajput .................... H04L 63/20 |
| 2023/0413214 | A1* | 12/2023 | Khare .................... H04L 43/10 |

OTHER PUBLICATIONS

3GPP TS 29.510 V17.1.0 (Mar. 2021). 3rd Generation Partnership Project; Technical Specification Group Core Network and Terminals; 5G System; Network Function Repository Services; Stage 3 (Release 17). (Year: 2021).*

* cited by examiner

*Primary Examiner* — Marcus Hammonds (57) ABSTRACT

A wireless communication network serves wireless data services to wireless user devices. In the wireless communication network, communication circuitry receives a registration from a source Network Repository Function (NRF) for a registering Network Function (NF). The communication circuitry transfers the registration to processing circuitry. The processing circuitry determines when the source NRF has an excessive amount of the NF type. When the source NRF does not have the excessive amount of the NF type, the processing circuitry a registration approval to the communication circuitry. The communication circuitry transfers the registration approval to the source NRF. When the source NRF has an excessive amount of the NF type, the processing circuitry selects a target NRF based on the geolocation of the registering NF. The processing circuitry transfers a registration redirection that indicates the target NRF to the communication circuitry. The communication circuitry transfers the registration redirection to the source NRF.

20 Claims, 7 Drawing Sheets

NETWORK FUNCTION REGISTRATION WITH NETWORK REPOSITORY FUNCTIONS

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless communication networks have Radio Access Networks (RANs) which exchange wireless signals with the wireless user devices over radio frequency bands. The wireless signals use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN). The RANs exchange network signaling and user data with network elements that are often clustered together into wireless network cores. The RANs are connected to the wireless network cores over backhaul data links.

The RANs comprise Radio Units (RUs), Distributed Units (DUs) and Centralized Units (CUs). The RUs are mounted at elevation and have antennas, modulators, signal processor, and the like. The RUs are connected to the DUs which are usually nearby network computers. The DUs handle lower wireless network layers like the Physical Layer (PHY) and Media Access Control (MAC). The DUs are connected to the CUs which are larger computer centers that are closer to the network cores. The CUs handle higher wireless network layers like the Radio Resource Control (RRC) and Packet Data Convergence Protocol (PDCP). The CUs are coupled to network functions in the network cores. The network cores execute the network functions to provide wireless data services to the wireless user devices over the RANs. Exemplary network functions include Access and Mobility Management Functions (AMFs) and Network Repository Functions (NRFs).

In a wireless network core, the AMF interacts with the wireless user devices over the RANs to authenticate and authorize the devices for the wireless data services. The AMF signals other network functions like Session Management Function (SMF) and Policy Control Function (PCF) to control the delivery of the wireless data services to the wireless user devices over the RANs. To communicate with one another, the network functions like AMF and SMF register with an NRF. The NRF provides a contact registry for the other network functions in the core. The network functions register their network address and function type with the NRF. In some cases, a multitude of the same network function type registers with a single NRF. Unfortunately, when the single NRF experiences performance issues, the wireless communication network also loses that network function type. Moreover, the NRFs do not effectively register network functions.

TECHNICAL OVERVIEW

A wireless communication network serves wireless data services to wireless user devices. In the wireless communication network, communication circuitry receives a registration from a source Network Repository Function (NRF) for a registering Network Function (NF). The registering NF is instantiated at a geolocation and has an NF type. The communication circuitry transfers the registration to processing circuitry. The processing circuitry receives the registration from the communication circuitry and determines when the source NRF has an excessive amount of the NF type. When the source NRF does not have the excessive amount of the NF type, the processing circuitry transfers a registration approval to the communication circuitry. The communication circuitry receives the registration approval from the processing circuitry and transfers the registration approval to the source NRF. When the source NRF has an excessive amount of the NF type, the processing circuitry selects a target NRF based on the geolocation of the registering NF and transfers a registration redirection that indicates the target NRF to the communication circuitry. The communication circuitry receives the registration redirection and transfers the registration redirection that indicates the target NRF to the source NRF.

DETAILED DESCRIPTION

Figure 1:
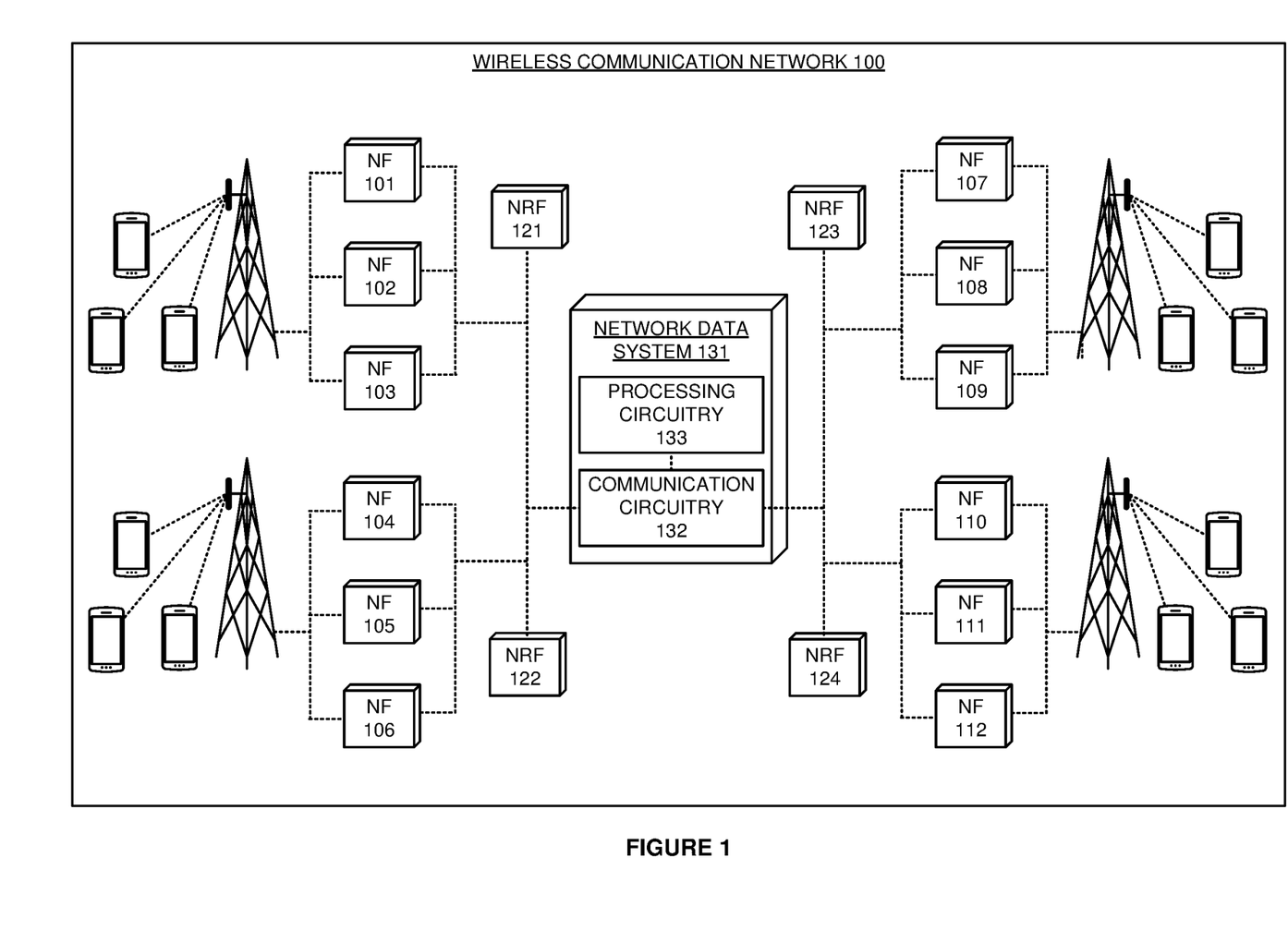
FIG. 1 illustrates a wireless communication network to register Network Functions (NFs) with Network Repository Functions (NRFs).

FIG. 1 illustrates wireless communication network 100 to register Network Functions (NFs) 101-112 with Network Repository Functions (NRFs) 121-124. Wireless communication network 100 delivers services like internet-access, machine communications, media-streaming, or some other wireless communications product to wireless user devices over wireless access points. Wireless communication network 100 comprises NFs 101-112, NRFs 121-124, and network data system 131. Network data system 131 comprises communication circuitry 132 and processing circuitry 133. NFs 101-112 register with NRFs 121-124 and interact with NRFs 121-124 to discovery each other.

Various examples of network operation and configuration are described herein. In some examples, NF 101 is instantiated at a geolocation and comprises an NF type. For example, the NF type for NF 101 may comprise an Access and Mobility Management Function (AMF), Session Management Function (SMF), or some other NF type. Communication circuitry 132 receives a registration from NRF 121 for NF 101. In some examples, communications circuitry 132 validates NRF 121 for registration support from system 131. Communication circuitry 132 transfers the registration to processing circuitry 133. Processing circuitry 133 determines when NRF 121 has registered an excessive amount of the NF type of NF 101. For example, processing circuitry 133 may determine when NRF 121 has reached a maximum number of AMFs. When NRF 121 has not registered an excessive amount of the NF type of NF 101, processing circuitry 133 transfers a registration approval to communication circuitry 132. Communication circuitry 132 transfers the registration approval to NRF 121. When NRF 121 has registered an excessive amount of the NF type of NF 101, processing circuitry 133 selects NRF 122 based on the geolocation of NF 101. For example, processing circuitry 133 may identify the locations of NRFs 122-124 and select NRF 122 because its location is more proximate to NF 101 than the locations of NRFs 123-124. Processing circuitry 133 transfers a registration redirection that indicates NRF 122 to communication circuitry 132. Communication circuitry 132 transfers the registration redirection to NRF 121. Advantageously, network data system 131 serves NRFs 121-124, so network 100 does not lose entire types of NFs 101-112 when individual NRFs 121-124 experience performance issues. Moreover, network data system 131 and NRFs 121-124 effectively register network functions 101-112 to avoid NF outages.

The wireless user devices and wireless access points illustrated in FIG. 1 communicate over links using wireless technologies like Fifth Generation New Radio (5GNR), Long Term Evolution (LTE), Low-Power Wide Area Network (LP-WAN), Institute of Electrical and Electronic Engineers (IEEE) 802.11 (WIFI), Bluetooth, and/or some other type of wireless networking protocol. The wireless technologies use electromagnetic frequencies in the low-band, mid-band, high-band, or some other portion of the electromagnetic spectrum. The wireless access points, NFs 101-112, NRFs 121-124, and network data system 131 communicate over various links that use metallic links, glass fibers, radio channels, or some other communication media. The links use Fifth Generation Core (5GC), IEEE 802.3 (Ethernet), Time Division Multiplex (TDM), Data Over Cable System Interface Specification (DOCSIS), Internet Protocol (IP), General Packet Radio Service Transfer Protocol (GTP), 5GNR, LTE, WIFI, virtual switching, inter-processor communication, bus interfaces, and/or some other data communication protocols.

The wireless user devices comprise computers, phones, vehicles, sensors, robots, or other types of data appliances with wireless communication circuitry. The wireless access points are depicted as towers, but the wireless access points may use other mounting structures or no mounting structures at all. The wireless access points comprise Fifth Generation (5G) RANs, LTE RANs, gNodeBs, eNodeBs, NB-IoT access nodes, LP-WAN base stations, wireless relays, WIFI hotspots, ENET access nodes, Bluetooth access nodes, and/or some other type of wireless or wireline network transceiver. The wireless user devices and the wireless access points comprise antennas, amplifiers, filters, modulation, analog/digital interfaces, microprocessors, software, memories, transceivers, bus circuitry, and the like. NFs 101-112 comprise network functions like AMFs, Session Management Functions (SMFs), User Plane Functions (UPFs), and the like. The wireless access points, NFs 101-112, NRFs 121-124, and network data system 131 comprise microprocessors, software, memories, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network functions. The microprocessors retrieve the software from the memories and execute the software to drive the operation of wireless communication network 100 as described herein.

Figure 2:
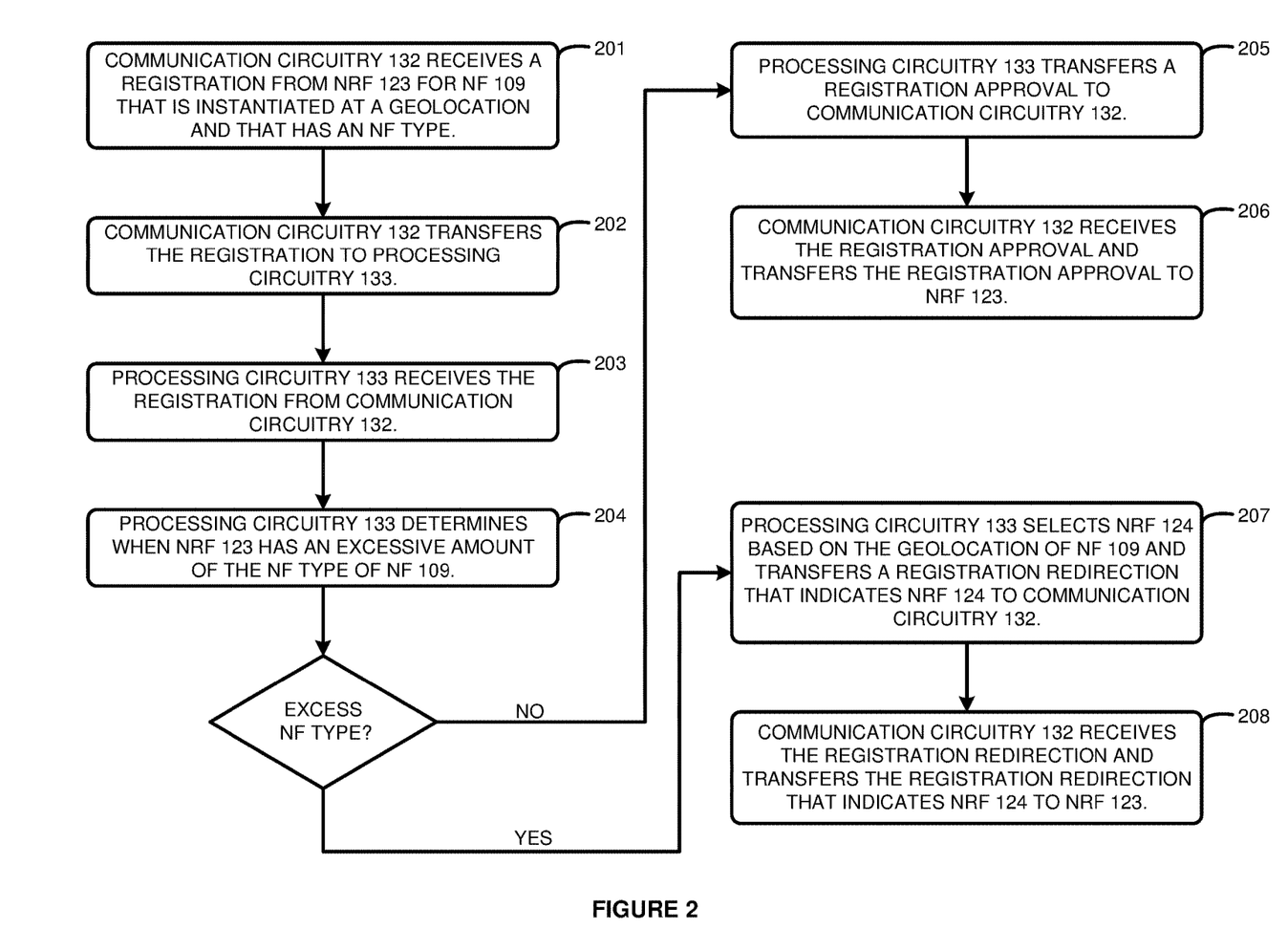
FIG. 2 illustrates an exemplary operation of the wireless communication network to register NFs with NRFs.

FIG. 2 illustrates an exemplary operation of wireless communication network 100 to register NFs 101-112 with NRFs 121-124. The operation may vary in other examples. Communication circuitry 132 receives a registration from NRF 123 for NF 109 that is instantiated at a geolocation and that has an NF type (201). Communication circuitry 132 transfers the registration to processing circuitry 133 (202). Processing circuitry 133 receives the registration from communication circuitry 132 (203). Processing circuitry 133 determines when NRF 123 has an excessive amount of the NF type of NF 109 (204). If processing circuitry 133 determines that NRF 123 does not have an excessive amount of the NF type of NF 109, then the operation proceeds to steps 205-206. Processing circuitry 133 transfers a registration approval to communication circuitry 132 (205). Communication circuitry 132 receives the registration approval and transfers the registration approval to NRF 123 (206). If processing circuitry 133 determines that NRF 123 has an excessive amount of the NF type of NF 109, then the operation proceeds to steps 207-208. Processing circuitry 133 selects NRF 124 based on the geolocation of NF 109 and transfers a registration redirection that indicates NRF 124 to communication circuitry 132 (207). Communication circuitry 132 receives the registration redirection and transfers the registration redirection that indicates NRF 124 to NRF 123 (208).

Figure 3:
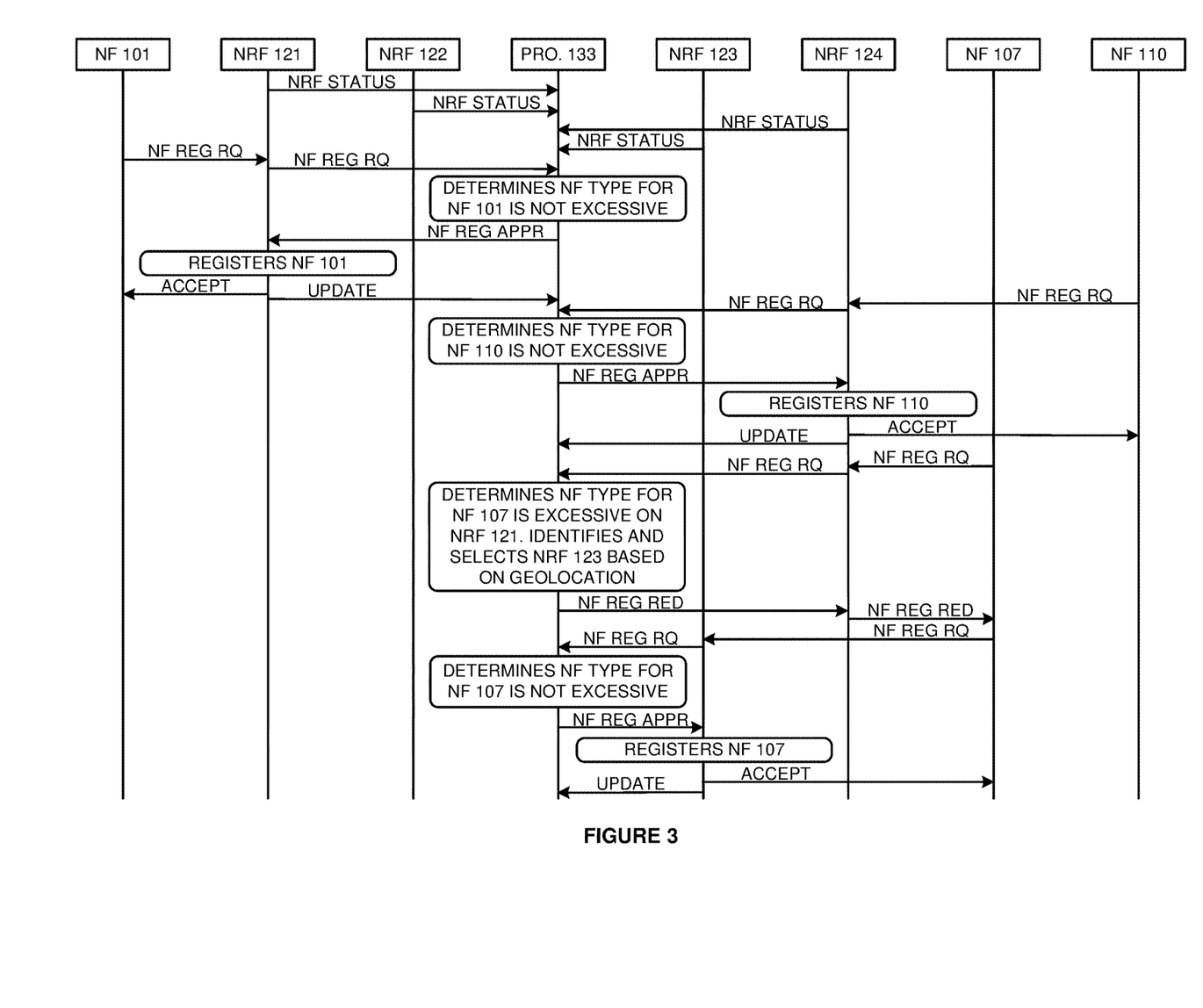
FIG. 3 illustrates another exemplary operation of the wireless communication network to register NFs with NRFs.

FIG. 3 illustrates an exemplary operation of wireless communication network 100 to register NFs 101-112 with NRFs 121-124. The operation may vary in other examples. NRF 121 indicates its NRF status to processing circuitry 133. The NRF status indicates the NFs and their types that are registered with NRF 121, NRF performance information, NRF geolocation, and or other NRF status information for NRF 121. For example, the NRF performance information may indicate processor load and memory occupancy for NRF 121. Similarly, NRF 122 indicates its NRF status to processing circuitry 133, NRF 123 indicate its NRF status to processing circuitry 133, and NRF 124 indicates its NRF status to processing circuitry 133.

NF 101 transfers an NF registration request (REG RQ) to NRF 121. The registration request indicates the NF type of NF 101 and the geolocation of NF 101. NRF 121 forwards the NF registration request to processing circuitry 133. Processing circuitry 133 determines the NF type for NF 101 is not excessive for NRF 121 based on the NRF status for NRF 121. For example, NF 101 may comprise an SMF and processing circuitry 133 may determine the number of SMFs registered with NRF 121 is below an SMF registration threshold for NRF 121. Processing circuitry 133 generates and transfers an NF registration approval (REG APPR) for NF 101 to NRF 121. NRF 121 registers NF 101 and indicates the registration acceptance to NF 101. NRF 121 transfers a status update that indicates the registration of NF 101 to processing circuitry 133. Processing circuitry 133 responsively updates the NRF status for NRF 121.

NF 110 transfers an NF registration request to NRF 124. The registration request indicates the NF type of NF 110 and the geolocation of NF 110. NRF 124 forwards the NF registration request to processing circuitry 133. Processing circuitry 133 determines the NF type for NF 110 is not excessive for NRF 124 based on the NRF status for NRF 124. Processing circuitry 133 generates and transfers an NF registration approval for NF 110 to NRF 124. NRF 124 registers NF 110 and indicates the registration acceptance to NF 110. NRF 124 transfers a status update that indicates the registration of NF 110 to processing circuitry 133. Processing circuitry 133 responsively updates the NRF status for NRF 124.

NF 107 transfers an NF registration request to NRF 124. The registration request indicates the NF type and geolocation of NF 107. NRF 124 forwards the NF registration request to processing circuitry 133. Processing circuitry 133 determines the NF type for NF 110 is excessive for NRF 124 based on the NRF status for NRF 124. For example, NF 101 may comprise an AMF and processing circuitry 133 may determine that the number of AMFs registered with NRF 121 has exceeded an AMF registration threshold for NRF 124. Processing circuitry 133 identifies NRFs 121-123 to redirect the registration of NF 107. Processing circuitry 133 selects NRF 123 to register NF 107 based on the geolocation of NRF 123 and geolocation of NF 107. Typically, processing circuitry 133 selects NRFs that are proximate to NFs for registration redirection over NRFs that are more distant to the NFs. In some examples, processing circuitry 133 selects NRFs for registration redirection based on NRF performance metrics like load and capacity. Processing circuitry 133 transfers a registration redirection that indicates NRF 123 to NRF 124. NRF 124 transfers the registration redirection to NF 107.

In response to the registration redirection, NF 107 transfers an NF registration request to NRF 123. The registration request indicates the NF type of NF 107 and the geolocation of NF 107. NRF 123 forwards the NF registration request to processing circuitry 133. Processing circuitry 133 determines the NF type for NF 107 is not excessive for NRF 123 based on the NRF status for NRF 123. Processing circuitry 133 generates and transfers an NF registration approval for NF 107 to NRF 123. NRF 123 registers NF 107 and indicates the registration acceptance to NF 107. NRF 123 transfers a status update that indicates the registration of NF 107 to processing circuitry 133. Processing circuitry 133 responsively updates the NRF status for NRF 123.

Figure 4:
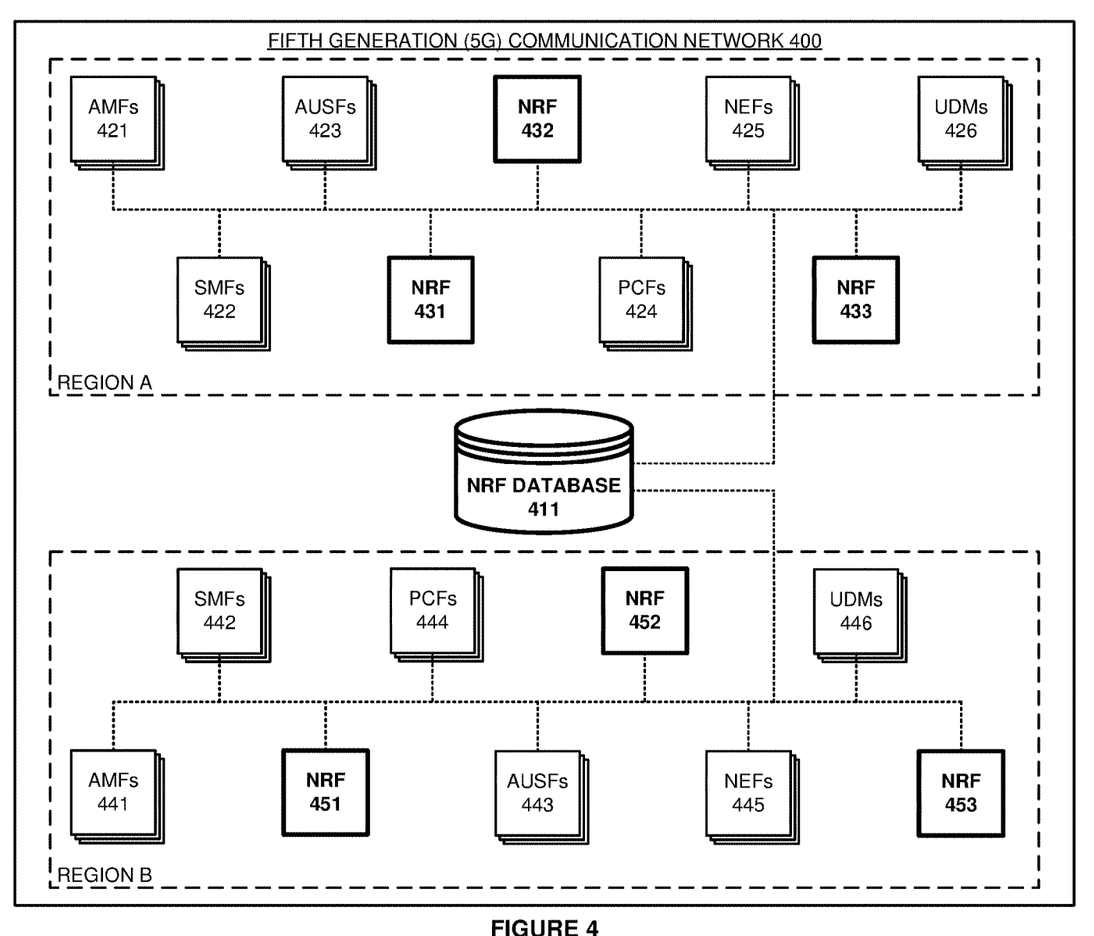
FIG. 4 illustrates a Fifth Generation (5G) communication network to register NFs with NRFs.

FIG. 4 illustrates Fifth Generation (5G) communication network 400 to register NFs with NRFs. 5G communication network 400 comprises an example of wireless communication network 100, although network 100 may differ. 5G communication network 400 is partitioned into Region A and Region B. Regions A and B comprise geographic regions, network partitions, distinct Public Land Mobile Networks (PLMNs), or some other type of network division within 5G communication network 400. In Region A, 5G network core 420 comprises Access and Mobility Management Functions (AMFs) 421, Session Management Functions (SMFs) 422, Authentication Server Functions (AUSFs) 423, Policy Control Functions (PCFs) 424, Network Exposure Functions (NEFs) 425, Unified Data Managements (UDMs) 426, and Network Repository Functions (NRFs) 431-433. In Region B, 5G communication network 400 comprises AMFs 441, SMFs 442, AUSFs 443, PCFs 444, NEFs 125, UDMs 426, and NRFs 451-453. 5G communication network also comprises NRF database 411 which interacts with NRFs 431-433 in Region A and NRFs 451-453 in Region B.

In Region A, NRFs 431-433 register with NRF database 411. NRFs 431-433 transfer status information to NRF database 411. The status information indicates registered NFs, numbers of registered NF types, NRF performance characteristics, NRF geolocation, and/or other NRF status information for individual ones of NRFs 431-433. For example, NRF 432 may transfer status information to NRF database 411 that indicates it is located in Region A, that five AMFs of AMFs 421 are registered with it, its Transactions Per Second (TPS), and its microprocessor load. NRF database 411 responsively generates and maintains NRF profiles for NRFs 431-433 that indicate the status information for individual ones of NRFs 431-433. NRFs 431-433 transfer status updates to NRF database 411 that indicate updated status information for themselves. For example, NRF 431 may transfer a status update that indicates an updated TPS. NRF database 411 updates the NRF profiles for NRFs 431-433 to indicate the status updates. NRFs 431-433 may transfer their status updates periodically, semi-randomly, randomly, in response to events, or by some other transfer metric.

In a like manner in Region B, NRFs 451-453 register with NRF database 411. NRFs 451-453 transfer status information that indicates registered NFs, numbers of registered NF type, NRF performance characteristics, NRF geolocation, and or other NRF status information for individual ones of NRFs 451-453 to NRF database 411. NRF database 411 responsively generates and maintains NRF profiles for NRFs 451-453 that indicate the status information for individual ones of NRFs 451-453. NRFs 451-453 transfer status updates to NRF database 411 that indicate updated status information for themselves. NRF database 411 updates the NRF profiles for NRFs 451-453 to indicate the status updates.

NRF database 411 determines NF thresholds for NRFs 431-433 and 451-453 that indicate the maximum number of NFs for each NF type that can register with individual ones of NRFs 431-433 and NRFs 451-453. For example, NRF database 411 may determine an NF threshold for NRF 453 that indicates it can register a maximum of three AMFs, three SMFs, two PCFs, and no other NF types. The NF thresholds may differ between 431-433 and NRFs 451-453. NRF database 411 updates the NRF profiles for NRFs 431-433 and 451-453 to indicate the NF thresholds.

In Region A, ones of NFs 421-426 transfer registration requests to NRFs 431-433. The registration requests comprise NF ID, NF type, NF address, NF geolocation and the like for individual ones of NFs 421-426. For example, a NEF of NEFs 425 may instantiate and responsively transfer a registration request to NRF 431. NRFs 431-433 receive the registration requests from NFs 421-426 and responsively indicate the registration requests to NRF database 411. NRF database 411 pairs the registration requests with the respective NRF. NRF database 411 identifies the NF thresholds for NRFs 431-433 and identifies when NRFs 431-433 are at registration capacity. For example, NRF database 411 may receive a registration request from NRF 433 for one of AMFs 421, query the NF threshold for NRF 433, and determine if NRF 433 is at its registration capacity for AMFs.

When NRF database 411 determines that NRFs 431-433 are below their registration capacity for the registering NFs, NRF database 411 transfers registration approvals to NRFs 431-433. NRFs 431-433 register the requesting ones of NFs 421-426. NRFs 431-433 transfer status updates to NRF database 411. The status updates indicate the new registrations. NRF database 411 responsively updates the NRF profiles for NRFs 431-433 to reflect the new registrations.

When NRF database 411 determines that NRFs 431-433 are at their registration capacity for the registering NFs, NRF database 411 retrieves the NRF profiles for NRFs 431-433 and 451-453 to redirect the requesting NF to another NRF. For example, NRF database 411 may receive a registration request from NRF 431 for one of UDMs 426, query the NF threshold for NRF 431, determine that NRF 431 cannot support an additional registration from a UDM, and responsively retrieve the NRF profiles for NRFs 432-433 and 451-453. NRF database 411 identifies the geolocations of the requesting NFs and the geolocations of NRFs 431-433 and 451-453. NRF database 411 determines candidate ones of NRFs 431-433 and 451-453 that can serve the requesting NFs based on the geolocations. For example, NRF database 411 may identify the geolocation of one of AMFs 421, the geolocation of NRF 451, and determine that NRF 451 does not have connectivity to the requesting one of AMFs 421 based on geolocation. NRF database 411 may use the geolocations to identify when the requesting NFs and NRFs 431-433 and 451-453 are in the same network region or serve the same PLMN to determine when NRFs 431-433 and 451-453 have connectivity to serve the requesting NF. In some examples, NF database 411 determines connectivity for NRFs 431-433 and 451-453 by querying NRFs 431-433 and 451-453. NRF database 411 may indicate the NF addresses of the requesting NFs to NRFs 431-433 and 451-453 and NRFs 431-433 and 451-453 may respond with an indication as to whether the NF address is reachable.

Once NRF database 411 has identified candidate NRFs to serve the requesting NFs, NRF database 411 ranks the candidate NRFs based on their geographic proximity to the requesting NFs and their performance characteristics like TPS, load, and capacity. In some examples, the load comprises microprocessor load and the capacity comprises memory occupancy. Typically, NRF database 411 ranks candidate NRFs that are geographically closer to the requesting NFs over NRFs that are geographically further from the requesting NFs. Typically, NRF database 411 ranks candidate NRFs that have a lower load over NRFs that have a high load. Typically, NRF database 411 ranks candidate NRFs that have a larger capacity over NRFs that have a lower capacity. NRF database 411 may normalize the geographic proximity, load, capacity, and/or other factors for the candidate NRFs into a score to rank the candidate NRFs. NRF database 411 selects the highest ranked candidate NRF to redirect the registration. NRF database 411 transfers registration redirection messages to NRFs 431-433 that indicate the selected candidate NRF. NRFs 431-433 transfer the registration redirection messages to the requesting NFs and the requesting NFs register with their indicated NRFs. In Region B, NFs 441-446 may register with NRFs 451-453 as described for Region A. NRF database 411 may approve and redirect the registrations for NFs 441-446 as described for Region A.

In some examples, NRF database 411 comprises a distributed database that this distributed across multiple geographic regions. Although NRF database 411 is depicted a standalone system, in some examples NRF database 411 may comprise a distributed database in NRFs 431-433 and NRFs 451-453. In this examples, NRFs 431-433 and 451-453 may approve and redirect registration requests from the network functions as described for NRF database 411.

Figure 5:
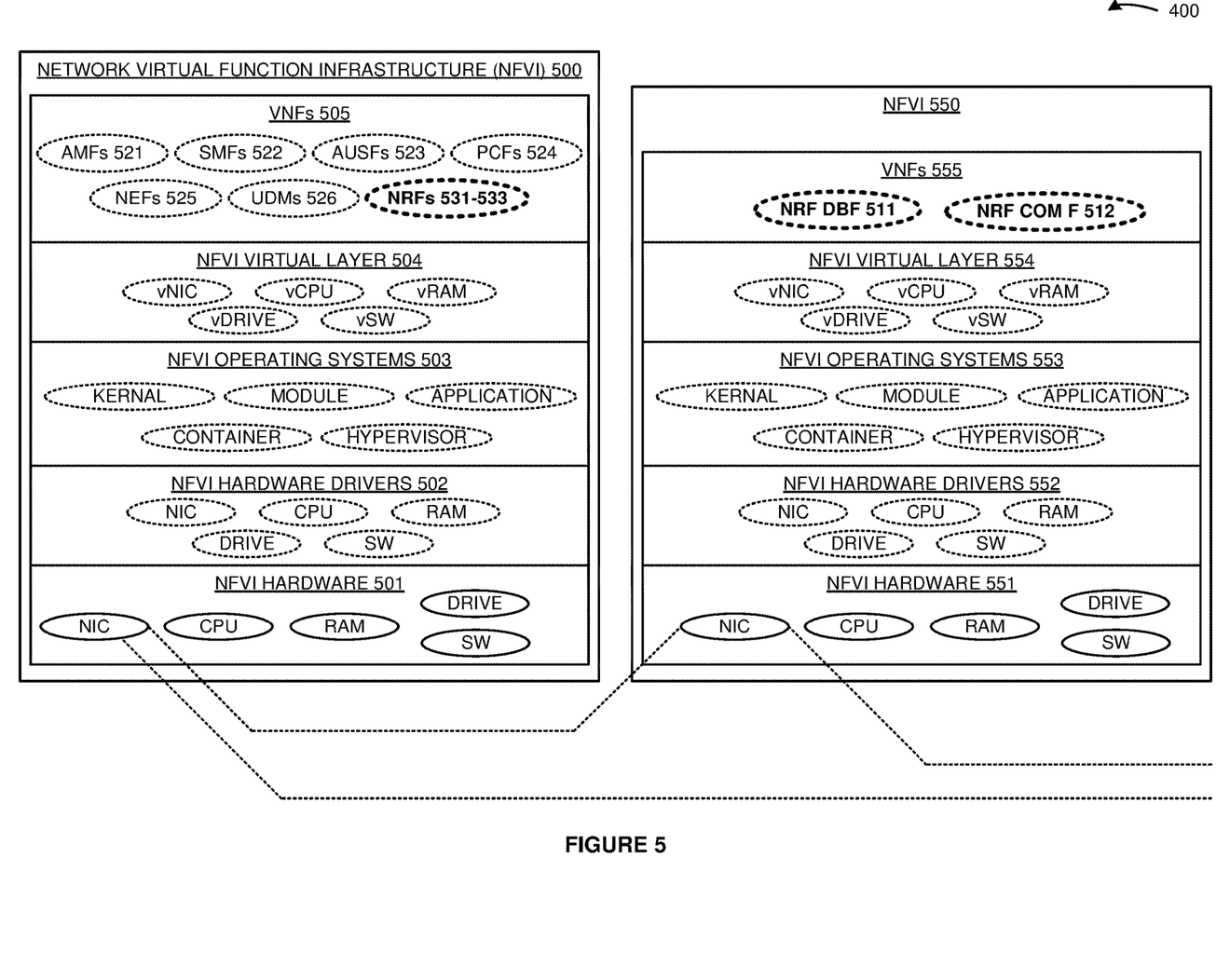
FIG. 5 illustrates Network Function Virtualization Infrastructures (NFVIs) in the 5G communication network.

FIG. 5 illustrates Network Function Virtualization Infrastructure (NFVI) 500 and NFVI 550 in 5G communication network 400. NFVI 500 comprises an example of NFs 101-112 and NRFs 121-124, although NFs 101-112 and NRFs 121-124 may vary from this example. NFVI 550 comprises an example of network data system 131, although network data system 131 may vary from this example. Processing circuitry 133 in network data system 131 from FIG. 1 may correspond to: the CPU, RAM, and DRIVE in NFVI hardware 551, the CPU driver, RAM driver, and DRIVE driver in NFVI hardware drivers 552, at least some of NFVI operating systems 553, the vCPU, vRAM, and vDRIVE in NFVI virtual layer 554, and NRF Database Function (DBF) 511 in VNFs 555. Communication circuitry 132 in network data system 131 from FIG. 1 may correspond to: the SW and NIC in NFVI hardware 551, the SW driver and NIC driver in NFVI hardware drivers 552, at least some of NFVI operating systems 553, the vSW and vNIC in NFVI virtual layer 554, and NRF Communication Function (COM F) 512 in VNFs 555.

NFVI 500 comprises NFVI hardware 501, NFVI hardware drivers 503, NFVI operating systems 503, NFVI virtual layer 504, and NFVI Virtual Network Functions (VNFs) 505. NFVI hardware 501 comprises Network Interface Cards (NICs), CPU, RAM, Flash/Disk Drives (DRIVE), and Data Switches (SW). NFVI hardware drivers 503 comprise software that is resident in the NIC, CPU, RAM, DRIVE, and SW. NFVI operating systems 503 comprise kernels, modules, applications, containers, hypervisors, and the like. NFVI virtual layer 504 comprises vNIC, vCPU, vRAM, vDRIVE, and vSW. NFVI VNFs 505 comprise AMFs 521, SMFs 522, AUSFs 523, PCFs 524, UDMs 525, NEFs 526, and NRFs 531-533. Additional VNFs and network elements like Network Slice Selection Functions (NSSFs), User Plane Functions (UPFs), and Unified Data Registries (UDRs) are typically present but are omitted for clarity. NFVI 500 may be located at a single site or be distributed across multiple geographic locations. The NIC in NFVI hardware 501 is coupled to a NIC in NFVI hardware 551 and to external systems. NFVI hardware 501 executes NFVI hardware drivers 503, NFVI operating systems 503, NFVI virtual layer 504, and NFVI VNFs 505 to form AMFs 421, SMFs 422, AUSFs 423, PCFs 424, UDMs 425, NEFs 426, and NRFs 431-433.

In a like manner, NFVI 550 comprises NFVI hardware 551, NFVI hardware drivers 552, NFVI operating systems 553, NFVI virtual layer 554, and NFVI VNFs 555. NFVI hardware 551 comprises NICs, CPU, RAM, DRIVE, and SW. NFVI hardware drivers 552 comprise software that is resident in the NIC, CPU, RAM, DRIVE, and SW. NFVI operating systems 553 comprise kernels, modules, applications, containers, hypervisors, and the like. NFVI virtual layer 554 comprises vNIC, vCPU, vRAM, vDRIVE, and vSW. NFVI VNFs 415 comprise NRF DBF 511 and NRF COM F 512. NFVI 550 may be located at a single site or be distributed database across multiple geographic locations. The NIC in NFVI hardware 551 is coupled to a NIC in NFVI hardware 501 and to external systems. NFVI hardware 551 executes NFVI hardware drivers 552, NFVI operating systems 553, NFVI virtual layer 554, and NFVI VNFs 555 to form NRF database 411. In some examples, NFs 441-446 and NRFs 451-453 utilize a similar NFVI architecture as NFVIs 500 and 550. In some examples, NFVI 500 and NFVI 550 are integrated into a signal NFVI that executes to from the network functions and network elements in Region A and Region B and NRF database 411.

Figure 6:
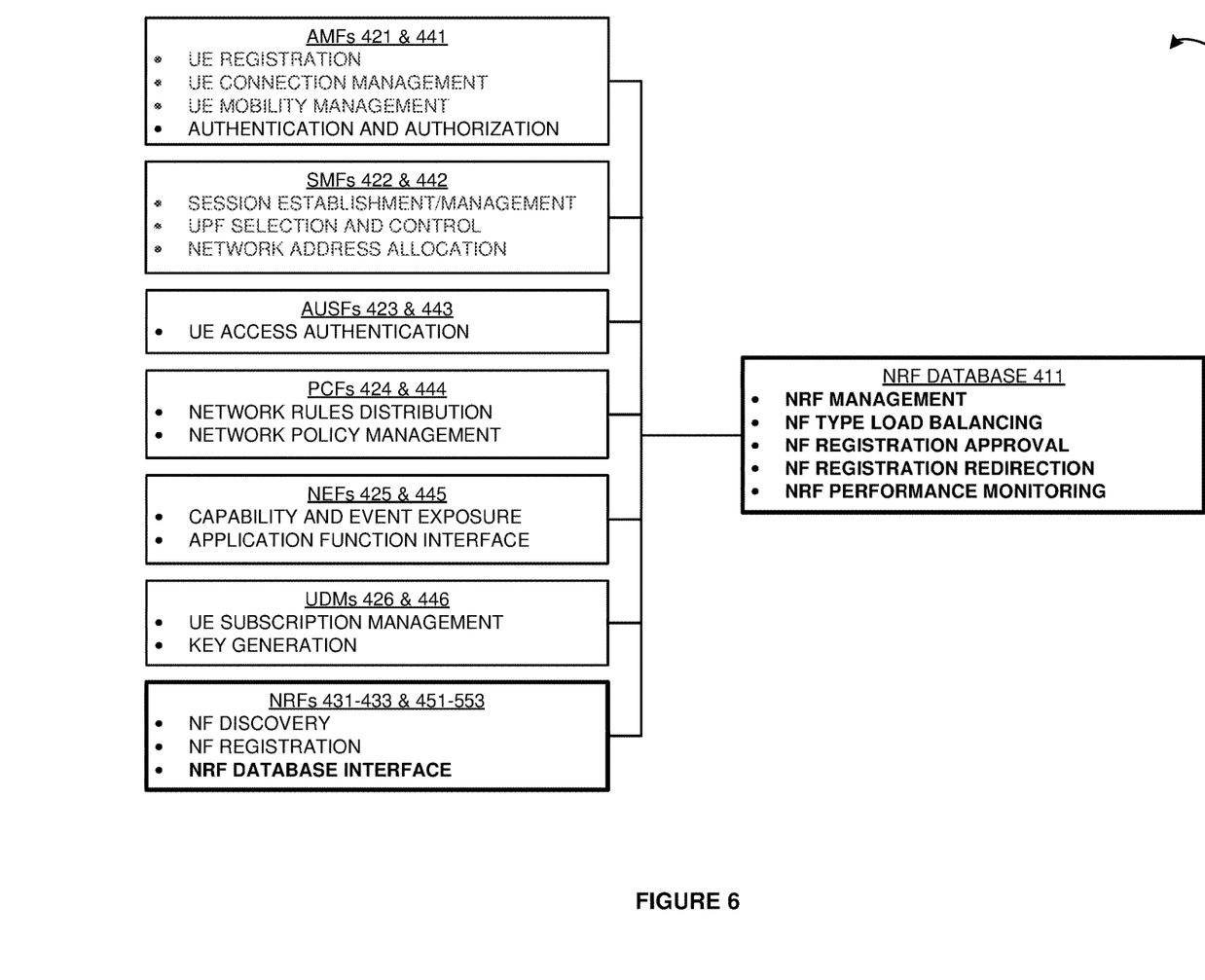
FIG. 6 further illustrates the NFVIs in the 5G communication network.

FIG. 6 further illustrate NFVI 500 and NFVI 550 in 5G communication network 400. AMPs 421 and 441 perform UE registration and connection, UE connection/mobility management, and UE authentication and authorization. SMFs 422 and 442 perform session establishment and management, UPF selection and control, and network address allocation. AUSFs 423 and 443 perform User Equipment (UE) access authentication. PCFs 424 and 444 perform rules distribution and network policy management. NEFs 425 and 445 perform network capabilities and events exposure and provide an Application Function (AF) interface. UDMs 426 and 446 perform UE subscription management and key generation. NRFs 431-433 and 451-453 perform NF discovery, NF registration, and provide an NRF database interface. NRF database 411 performs NRF management, NF type load balancing, NF registration approval, NF registration redirection, and NRF performance monitoring.

In this example, NRF database 411 approves an AMF registration for NRF 431 and redirects an SMF registration for NRF 431 to NRF 433, however the operation may vary in other examples. NRF 431 registers with NRF database 411. NRF 431 indicates its currently registered NF types, load, capacity, and NRF geolocation to NRF database 411. NRF database 411 creates an NRF profile for NRF 431 that indicates currently registered NF types, load, capacity, and NRF geolocation of NRF 431. NRF database 411 determines an NF threshold for NRF 431 that indicates the maximum number of NFs for each NF type that can register with NRF 431. NRF database 411 updates the NRF profile for NRF 431 to indicate its NF threshold.

An AMF of AMFs 421 transfers a registration request that indicates its NF ID, NF type, NF address, and NF geolocation to NRF 431. NRF 431 forwards the registration request for the AMF to NRF database 411. NRF database 411 retrieves the NF profile for NRF 431 and identifies the NF threshold for NRF 431. NRF database 411 determines that NRF 431 is not yet at capacity for AMF registrations based on the NF threshold. NRF database 411 transfers a registration approval to NRF 431. NRF 431 responsively registers the AMF and indicates the successful registration to the AMF. NRF 431 transfers a status update that indicates the new registration to NRF database 411. NRF database 411 updates the NRF profile for NRF 431 to indicate the registration of the AMF.

Subsequently, an SMF of SMFs 422 transfers a registration request that indicates its NF ID, NF type, NF address, NF geolocation to NRF 431. NRF 431 forwards the registration request for the SMF to NRF database 411. NRF database 411 retrieves the NF profile for NRF 431 and identifies the NF threshold for NRF 431. NRF database 411 determines that NRF 431 is at capacity for SMF registrations based on the NF threshold. For example, the NF profile may indicate that NRF 431 has six active SMF registrations and the NF threshold may indicate that NRF 431 can support a maximum of six SMF registrations. In response, NRF database 411 retrieves the NRF profiles for NRFs 432-433 and 451-453. NRF database 411 determines the network regions for NRFs 432-433 and 451-453 based on their geolocations and network addresses from their NRF profiles. NRF database 411 determines the network region for the requesting SMF based on its geolocation and NF address based on the registration request. NRF database 411 identifies NRFs 432-433 as candidate NRFs based on their shared network region with the SMF. Similarly, NRF database 411 determines NRFs 451-543 are not candidate NRFs because they are located in a different network region than the requesting SMF. In some examples, NRF database 411 determines the served PLMNs for NRFs 432-433 and 451-453 and NFs based on their geolocations and addresses to select candidate NRFs for registration redirection. Typically, NRF database 411 selects candidate NRFs that serve the same PLMN as the requesting NF.

NRF database 411 uses the NF profiles to identify the geolocation, load, and capacity for NRFs 432-433. NRF database 411 normalizes the geolocation, load, and capacity for NRFs 432-433 into a combined score. NRF database 411 may weight the different metrics used to create the combined score to prioritize certain metrics over other. For example, if geolocation is more important than NRF load, NRF database 411 may weight geolocation over NRF load to generate the combined score. NRF database 411 ranks the scores of NRFs 432-433 and responsively selects NRF 433 based on its score. NRF database 411 transfers a registration redirection message that indicates NRF 433 to NRF 431. NRF 431 transfers the registration redirection message to the requesting SMF of SMFs 422.

The SMF of SMFs 422 receives the registration redirection and identifies NRF 433 as the registration target. The SMF transfers a registration request that indicates its NF ID, NF type, NF address, NF geolocation to NRF 433. NRF 433 forwards the registration request for the SMF to NRF database 411. NRF database 411 retrieves the NF profile for NRF 433 and identifies the NF threshold for NRF 433. NRF database 411 determines that NRF 433 is not yet at capacity for SMF registrations based on the NF threshold. NRF database 411 transfers a registration approval to NRF 433. NRF 433 responsively registers the SMF and indicates the successful registration to the SMF. NRF 433 transfers a status update that indicates the new registration to NRF database 411. NRF database 411 updates the NRF profile for NRF 433 to indicate the SMF registration.

Figure 7:
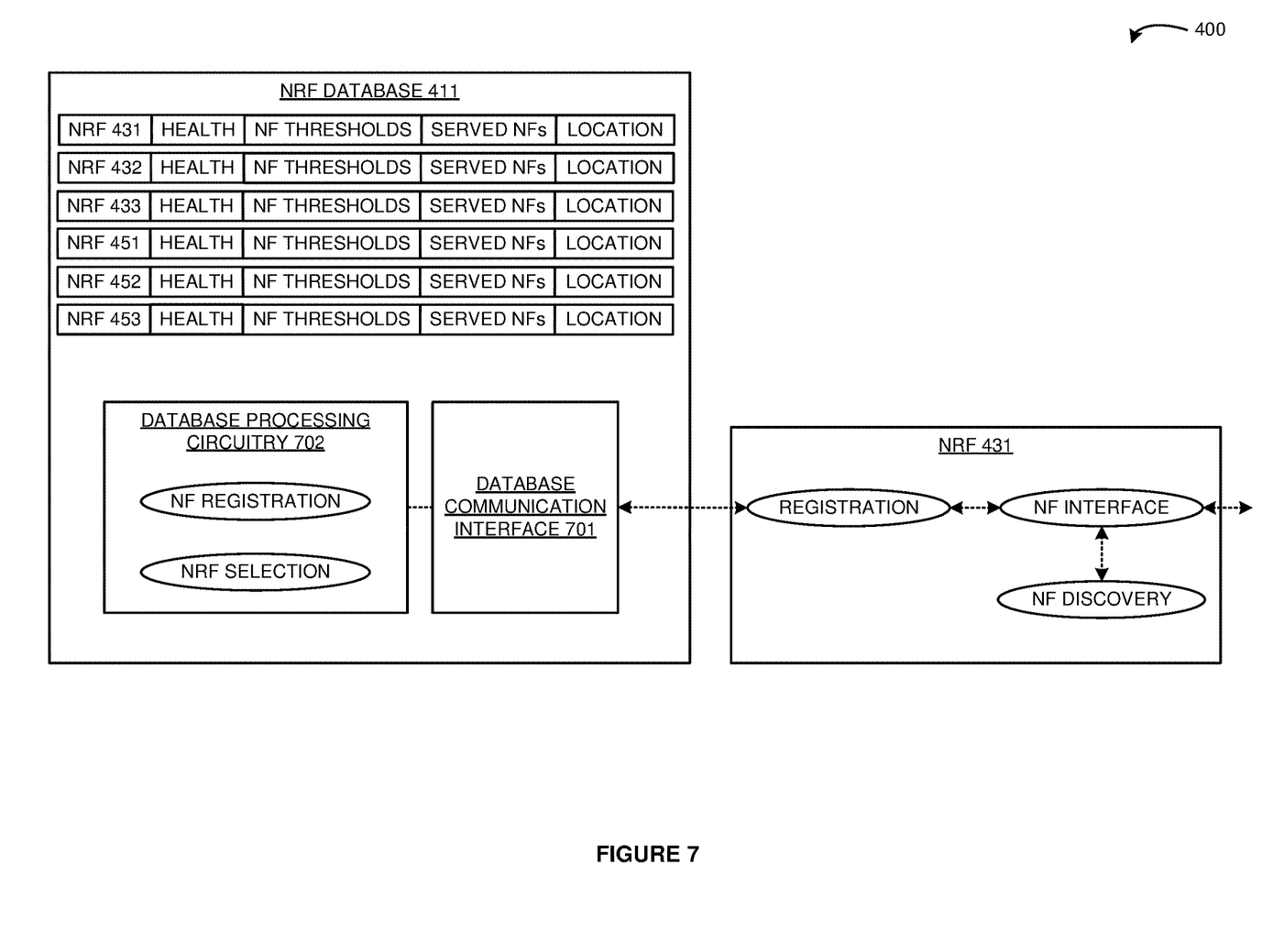
FIG. 7 illustrates NRFs and an NRF database in the 5G communication network.

FIG. 7 illustrates NRF database 411 and NRF 431 in 5G communication network 400. NRF database 411 comprises an example of network data system 131, however data system 131 may differ. NRF 431 comprises an example of NRFs 121-124, however NRFs 121-124 may differ. NRFs 432-433 and 451-453 may be similar to NRF 431. NRF database 411 comprises database communications interface 701 and database processing circuitry 702. Database communications interface 701 comprises an example of communications circuitry 132, although communications circuitry 132 may differ. Database processing circuitry 702 comprises an example of processing circuitry 133, although processing circuitry 133 may differ. NRF database 411 stores NRF data that indicates NRF performance health, NF thresholds, and served NFs for NRFs 431-433 and 451-453. Database communication interface 701 interacts with NRF 431 to exchange registration requests and registration redirections. Database processing circuitry 702 comprises registration components to handle registration requests from NRF 431. Database processing circuitry 702 comprises NRF selection components to handle NRF selection for NF registration redirection. For registration redirection, lightly loaded NRFs are typically given a higher priority than heavily loaded NRFs. Geographically closer NRFs are typically given a higher priority than geographically further NRFs. Load, location, and other factors may be normalized and combined into a common priority score to rank NRFs for registration redirection. NRF 431 comprises NF interface components to exchange registration information with NFs. NRF 431 comprises registration components that interact with other network functions to register NFs and to obtain NF types and NF locations for NRF database 411. NRF 431 comprises NF discovery components to handle NF discovery requests from NFs.

The wireless data network circuitry described above comprises computer hardware and software that form special-purpose network circuitry to direct another wireless communication network to register NFs with NRFs. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to register NFs with NRFs.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication network that serves wireless data services to wireless user devices, the method comprising:
    communication circuitry receiving a registration from a source Network Repository Function (NRF) for a registering Network Function (NF) that is instantiated at a geolocation and that has an NF type and transferring the registration to processing circuitry;
    the processing circuitry receiving the registration from the communication circuitry and determining when an amount of the NF type registered by the source NRF exceeds a NF type threshold for the source NRF;
    when the amount of the NF type registered by the source NRF does not exceed the NF type threshold, the processing circuitry transferring a registration approval to the communication circuitry;
    the communication circuitry receiving the registration approval from the processing circuitry and transferring the registration approval to the source NRF;
    when the amount of the NF type registered by the source NRF exceeds the NF type threshold for the source NRF, the processing circuitry selecting a target NRF based on the geolocation of the registering NF and transferring a registration redirection that indicates the target NRF to the communication circuitry; and
    the communication circuitry receiving the registration redirection and transferring the registration redirection that indicates the target NRF to the source NRF.

2. The method of claim 1 wherein the registering NF comprises one of an Access and Mobility Management Function (AMF), a Session Management Function (SMF), an Authenticating Server Function (AUSF), a Policy Control Function (PCF), a Unified Data Management (UDM), or a Network Exposure Function (NEF).

3. The method of claim 1 wherein selecting the target NRF based on the geolocation of the registering NF comprises selecting the target NRF based on a geolocation of the target NRF and the geolocation of the registering NF.

4. The method of claim 1 wherein selecting the target NRF based on the geolocation of the registering NF comprises identifying a Public Land Mobile Network (PLMN) for the registering NF and selecting a set of candidate NRFs that serve the PLMN.

5. The method of claim 1 wherein selecting the target NRF based on the geolocation of the registering NF comprises identifying a network region for the registering NF and selecting a set of candidate NRFs that serve the network region.

6. The method of claim 1 wherein selecting the target NRF based on the geolocation of the registering NF comprises comparing NRF performance for a set of candidate NRFs.

7. The method of claim 1 wherein the processing circuitry and communication circuitry comprise a geographically distributed database.

8. The method of claim 1 wherein the processing circuitry and communication circuitry are distributed within at least the source NRF and the target NRF.

9. The method of claim 1 wherein the processing circuitry and communication circuitry comprise a Network Function Virtualization Infrastructure (NFVI).

10. A wireless communication network that serves wireless data services to wireless user devices, the wireless communication network comprising:
    communication circuitry configured to receive a registration from a source Network Repository Function (NRF) for a registering Network Function (NF) that is instantiated at a geolocation and that has an NF type and transfer the registration to processing circuitry;
    the processing circuitry configured to receive the registration from the communication circuitry and determine when an amount of the NF type registered by the source NRF exceeds an NF type threshold for the source NRF;
    when the amount of the NF type registered by the source NRF does not exceed the NF type threshold, the processing circuitry further configured to transfer a registration approval to the communication circuitry;
    the communication circuitry further configured to receive the registration approval from the processing circuitry and transfer the registration approval to the source NRF;
    when the amount of the NF type registered by the source NRF exceeds the NF type for the source NRF, the processing circuitry further configured to select a target NRF based on the geolocation of the registering NF and transfer a registration redirection that indicates the target NRF to the communication circuitry; and
    the communication circuitry further configured to receive the registration redirection and transfer the registration redirection that indicates the target NRF to the source NRF.

11. The wireless communication network of claim 10 wherein the registering NF comprises one of an Access and Mobility Management Function (AMF), a Session Management Function (SMF), an Authenticating Server Function (AUSF), a Policy Control Function (PCF), a Unified Data Management (UDM), or a Network Exposure Function (NEF).

12. The wireless communication network of claim 10 wherein the processing circuitry is further configured to select the target NRF based on a geolocation of the target NRF and the geolocation of the registering NF.

13. The wireless communication network of claim 10 wherein the processing circuitry is further configured to identify a Public Land Mobile Network (PLMN) for the registering NF and select a set of candidate NRFs that serve the PLMN.

14. The wireless communication network of claim 10 wherein the processing circuitry is further configured to identify a network region for the registering NF and select a set of candidate NRFs that serve the network region.

15. The wireless communication network of claim 10 wherein the processing circuitry is further configured to compare NRF performance for a set of candidate NRFs.

16. The wireless communication network of claim 10 wherein the processing circuitry and communication circuitry comprise a geographically distributed database.

17. The wireless communication network of claim 10 wherein the processing circuitry and communication circuitry are distributed within at least the source NRF and the target NRF.

18. The wireless communication network of claim 10 wherein the processing circuitry and communication circuitry comprise a Network Function Virtualization Infrastructure (NFVI).

19. One or more non-transitory computer readable storage media having program instructions stored thereon, wherein the program instruction, when executed by a computing system, direct the computing system to perform operations, the operations comprising:
  receiving a registration from a source Network Repository Function (NRF) for a registering Network Function (NF) that is instantiated at a geolocation and that has an NF type;
  determining when an amount of the NF type registered by the source NRF exceeds a NF type threshold for the source NRF;
  when the amount of the NF type registered by the source NRF does not exceed the NF type threshold, transferring a registration approval to the source NRF; and
  when the amount of the NF type registered by the source NRF exceeds the NF type threshold for the source NRF, selecting a target NRF based on the geolocation of the registering NF and transferring a registration redirection that indicates the target NRF to the to the source NRF.

20. The one or more non-transitory computer readable storage media 19 wherein the registering NF comprises one of an Access and Mobility Management Function (AMF), a Session Management Function (SMF), an Authenticating Server Function (AUSF), a Policy Control Function (PCF), a Unified Data Management (UDM), or a Network Exposure Function (NEF).

* * * * *